United States Patent [19]
Shollenberger

[11] Patent Number: 5,943,003
[45] Date of Patent: Aug. 24, 1999

[54] RADAR SYSTEM

[75] Inventor: Dean L. Shollenberger, Townsend, Mass.

[73] Assignee: Raytheon Company, Lexington, Mass.

[21] Appl. No.: 08/972,823

[22] Filed: Nov. 18, 1997

[51] Int. Cl.$^6$ .................................................. G01S 13/64
[52] U.S. Cl. ............................ 342/94; 342/95; 342/104; 342/115
[58] Field of Search ................................ 342/94, 95, 104, 342/115

[56] References Cited

U.S. PATENT DOCUMENTS

| | | | |
|---|---|---|---|
| 3,858,208 | 12/1974 | Parke et al. ................................. | 342/88 |
| 4,042,925 | 8/1977 | Albanese et al. ......................... | 342/132 |
| 4,499,466 | 2/1985 | Torino, Jr. et al. ........................ | 342/95 |
| 4,680,589 | 7/1987 | Bryant et al. ............................. | 342/196 |
| 5,374,931 | 12/1994 | Wiener ...................................... | 342/115 |

*Primary Examiner*—John B. Sotomayor
*Attorney, Agent, or Firm*—Fish & Richardson P.C.

[57] ABSTRACT

A radar system for processing a series of radar returns to determine Doppler velocity of an object. Each one of the radar returns is produced in response the object reflecting each one of a series of transmitted radar pulses. The series of radar returns is processed in a sequence of successive dwells. Each one of the dwells has a predetermined number of radar returns. The radar system includes a system clock for producing a series of clock pulses. A range gate is provided for sampling each one of a series of radar returns produced in response to a each one of a series of transmitted radar pulse. The range gate has a time duration equal to an integer number of, N, clock pulse periods. A range gate positioning system initiates the range gate a selected time, $\Delta$, after each one of the transmitted pulses. The positioning system determines the selected time, $\Delta$, as an integer number of, M, clock pulse periods for a predetermined number of transmitted pulses and then subsequently changes such integer M to a different integer number, M'. More particularly, the range gate positioning system determines the integer number, M, in accordance with a predetermined fractional offset, $\delta$, of a clock pulse period, T, of the position of an object within the clock pulse period, T, from a predetermined desired position within the clock pulse period, T, and the integer M' being determined in accordance with the Doppler velocity of the object. The range gate positioning system determines M' is accordance with the number of PRIs per clock pulse period the object moves relative to the radar system) and determines M in accordance with $M=[1-(\delta/T)]M'$.

7 Claims, 5 Drawing Sheets

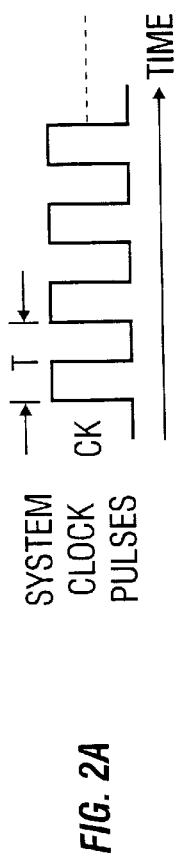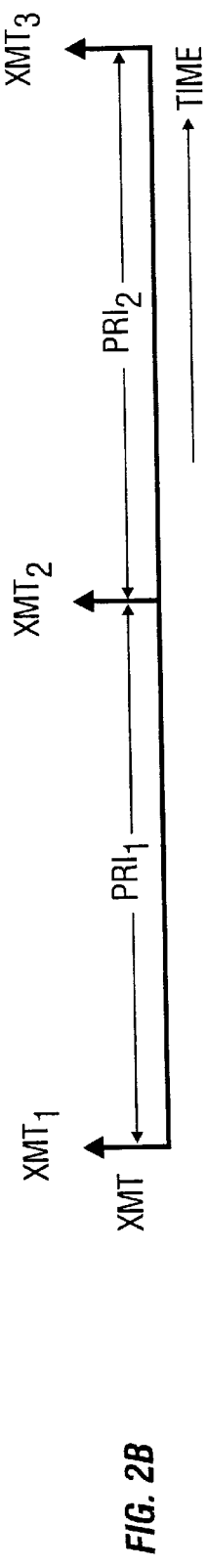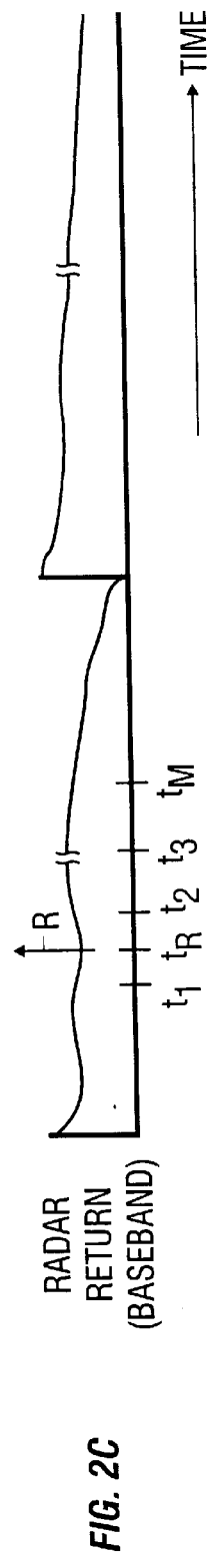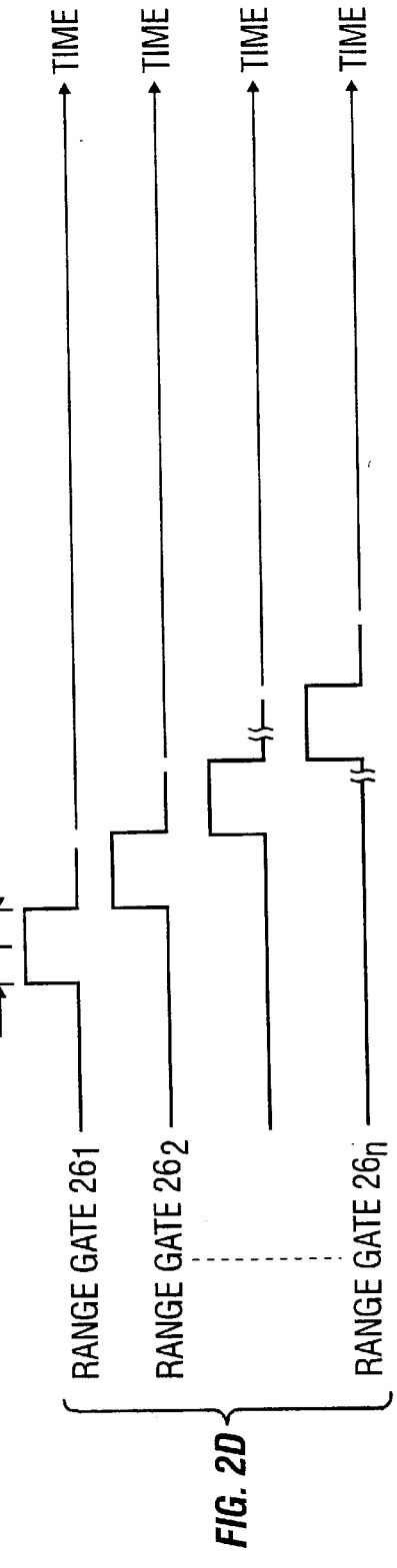

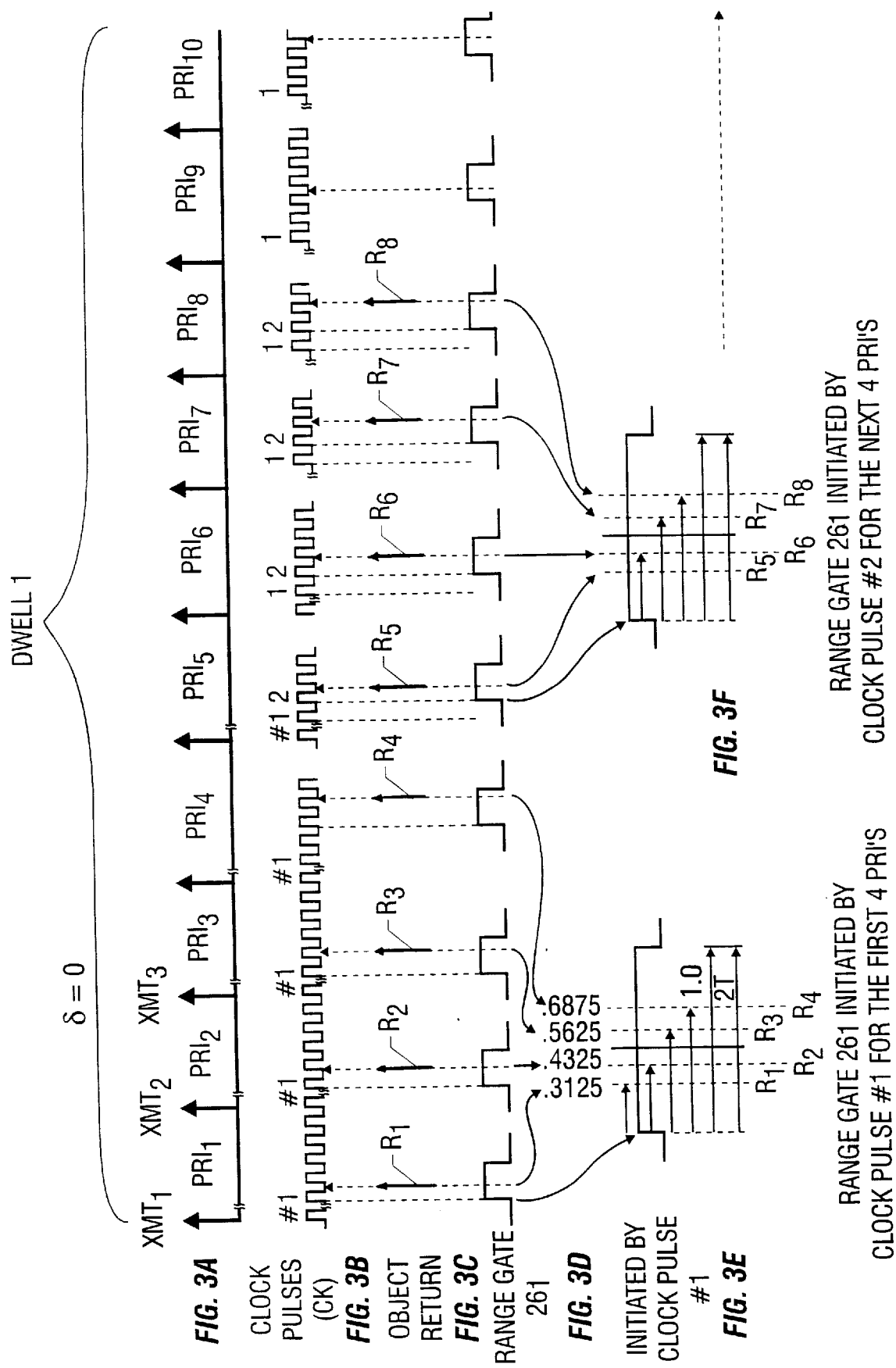

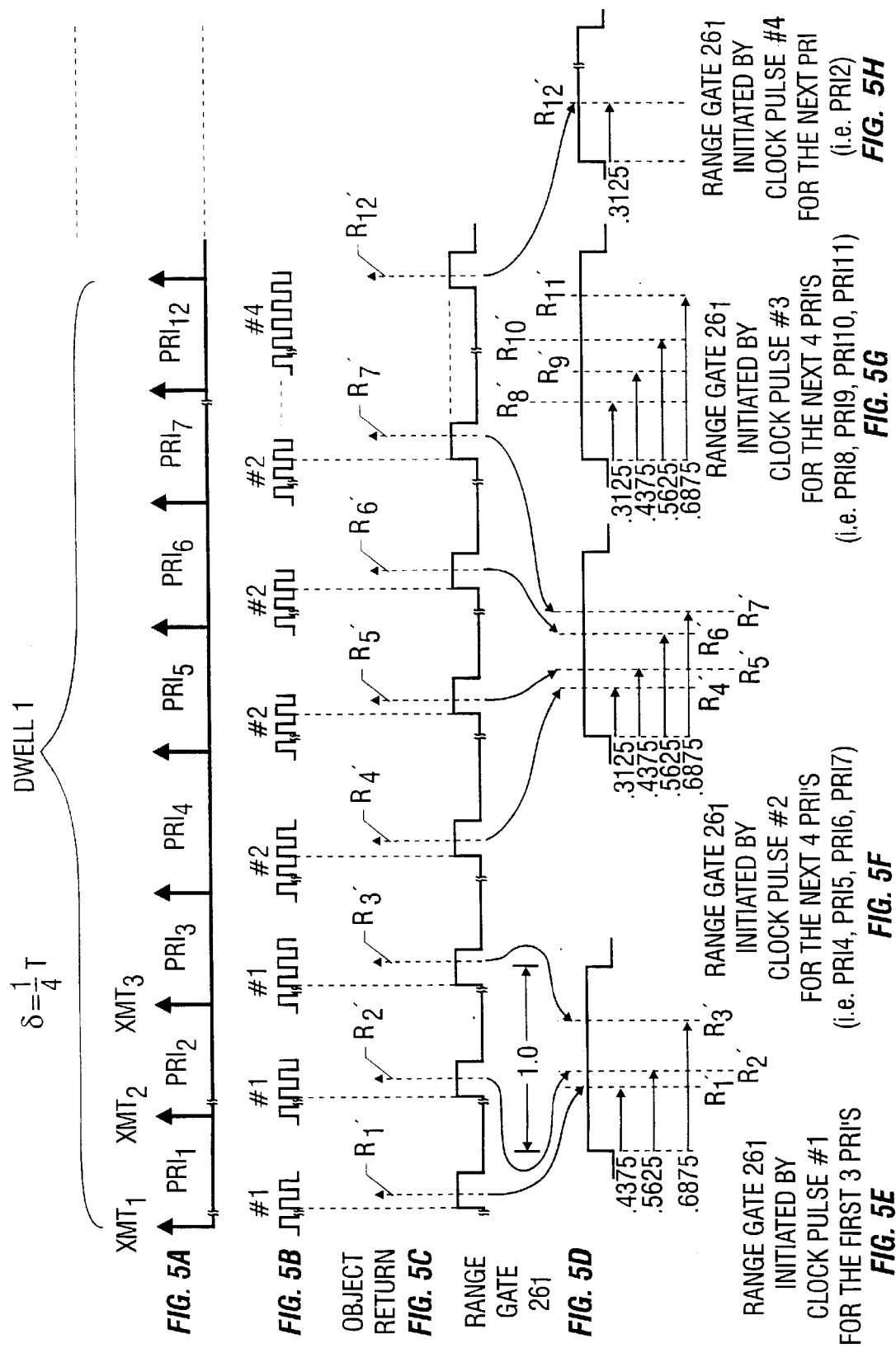

RADAR SYSTEM

This invention was made with Government support under Department of the Navy Contract No. N00024-94-C-5302 awarded by the United States Navy.

BACKGROUND OF THE INVENTION

This invention relates generally to radar systems and more particularly to range gate positioning systems used in such radar systems.

As is known in the art, radar systems, such as pulse Doppler radar systems, are used to determine the range and/or relative velocity (i.e., Doppler velocity) of an object. Radar pulses are transmitted at a rate referred to as the pulse repetition frequency (PRF). The time interval between successive pulses is referred to as the pulse repetition interval (PRI). During a predetermined time after pulse transmission, radar return signals are sampled, or range gated, by the radar signal. That is, based on the difference in time between pulse transmission and the time which the sample is taken, each one of the samples corresponds to a range, or distance, between the radar system and the object producing the sampled return. The process is referred to as range gating, where each time a sample is taken represents a range cell, or gate, of the return produced by the object at the range corresponding to the time at which the sample is taken.

In applications where there is a relative velocity (i.e., Doppler velocity) between the radar system and the object, in order to track the object, the time at which the radar return sample is taken after pulse transmission is changed in accordance with the relative velocity between the radar system and the object. Thus, if the object is moving away from the radar system, the time at which the radar return is sampled relative to the time the radar pulse is transmitted must increase from radar pulse to radar pulse at a rate proportional to the relative velocity, or Doppler velocity, between the radar system and the object. In like manner, if the object is moving towards from the radar system, the time at which the radar return is sampled relative to the time the radar pulse is transmitted must decrease from radar pulse to radar pulse at a rate proportional to the Doppler velocity between the radar system and the object.

In order to determine the Doppler velocity of the object, the radar returns from a plurality of transmitted radar pulses are processed. More particularly, each set of radar returns from a plurality of consecutively transmitted radar pulses is referred to as a dwell. The radar system produces a plurality of consecutive dwells. For each dwell, the radar system determines the average Doppler frequency of an object at one of a plurality of contiguous range gates. Fine Doppler velocity resolution generally requires the a large number of radar returns per dwell (i.e., a relatively large data collection period). For objects having relatively high Doppler velocities, this data collection period translates into a time period during which the object to radar system range can experience a large change. If the range accuracy is less than the object movement over the dwell, some type of dynamic range gate adjustment (i.e., range gate positioning system) is required in order to maintain the range to the object in the middle of each dwell and thereby enable the radar system to track the range to the object with maximum signal to noise ratio.

Several systems have been used range "walk" compensation or velocity aiding schemes to move range gates during a dwell to prevent the object from passing through the "window" (i.e., time duration) of the range gate. In general, however, these systems have three limitations: First, the range resolution (i.e., window time duration) to which the gate can be placed is typically limited to at least one clock period of the radar system timing generator (i.e., the radar system clock pulse period) and range resolution less than a full system clock pulse period may be required; or second, the system may utilize tapped delay lines having gate delays which may be shorter than the system clock pulse period but may not be precisely repeatable because of the analog nature of a delay line; or, third, the system uses multiple system clocks which are difficult to synchronize.

SUMMARY OF THE INVENTION

In accordance with the present invention, a radar system is provided having a system clock for producing a series of clock pulses. A range gate samples each one of a series of radar returns produced in response to a each one of a series of transmitted radar pulse. The range gate has a time duration equal to an integer number of, N, clock pulse periods. A range gate positioning system is included. The range gate positioning system initiates the range gate a selected time, Δ, after each one of the transmitted pulses. The selected time, Δ, is an integer number of, M, clock pulse periods for a predetermined number of transmitted pulses and then subsequently changes to a different integer number.

With such an arrangement, the position of a return may be changed in a range gate to amount less than a clock pulse period.

In accordance with another feature of the invention, a radar system is provided for processing a series of radar returns to determine Doppler velocity of an object. Each one of the radar returns is produced in response the object reflecting each one of a series of transmitted radar pulses. The series of radar returns is processed in a sequence of successive dwells. Each one of the dwells has a predetermined number of radar returns. The radar system includes a system clock for producing a series of clock pulses. A range gate is provided for sampling each one of a series of radar returns produced in response to a each one of a series of transmitted radar pulse. The range gate has a time duration equal to an integer number of, N, clock pulse periods. A range gate positioning system initiates the range gate a selected time, Δ, after each one of the transmitted pulses. The positioning system determines the selected time, Δ, as an integer number of, M, clock pulse periods for a predetermined number of transmitted pulses and then subsequently changes such integer M to a different integer number, M'. More particularly, the range gate positioning system determines the integer number, M, in accordance with a predetermined fractional offset, δ, of a clock pulse period, T, of the position of an object within the clock pulse period, T, from a predetermined desired position within the clock pulse period, T, and the integer M' being determined in accordance with the Doppler velocity of the object.

In a preferred embodiment, the range gate positioning system determines M' is accordance with $M'=Tc/2V_D(PRI)$, where T is the clock pulse period, c is the speed of light, $V_D$ is the Doppler velocity of the object and PRI is the time duration between successively transmitted radar pulses (i.e., M' represents the number of PRIs per clock pulse period the object moves relative to the radar system) and determines M in accordance with $M=[1-(δ/T)]M'$.

BRIEF DESCRIPTION OF THE DRAWING

These and other features of the invention will become more readily apparent from the following detailed description taken together with the following drawings, m in which:

FIGS. 2A–2D are timing diagrams useful in understanding the operation of the radar system of FIG. 1; FIG. 2A showing a series of system clock pulses used in the radar system; FIG. 2B showing a series of transmitted radar pulses produced by the radar system; FIG. 2C showing radar returns from the object illuminated by the transmitted pulses; and FIG. 2D showing a plurality of range gates windows used by the radar system of FIG. 1;

FIGS. 3A–3F are timing diagrams useful in understanding the operation of the radar system of FIG. 1, such timing diagrams showing the operation of one of the range gates used in the radar system of FIG. 1 during one of a series of dwells under a condition where δ=0 and where there is a Doppler velocity between the object and the radar system: FIG. 3A showing a series of transmitted pulses during the dwell; FIG. 3B showing system clock pulses during the dwell; FIG. 3C showing a radar return produced by the object illuminated by the transmitted radar pulses of FIG. 3A; FIG. 3D showing the time relationship between the radar return of FIG. 3C and the initiation of the range gate by one of the system clock pulses after each one of the transmitted radar pulses; FIG. 3E is an enlarged drawing showing the timing relationship between the system clock, range gate and a radar return produced by a first sequence of the transmitted pulses; and FIG. 3F is an enlarged drawing showing the timing relationship between the system clock, range gate and a radar return produced by the subsequent sequence of the transmitted pulses;

FIG. 4A showing such relationship where δ=0; FIG. 4B showing such relationship where δ=(¾)T, where T is a system clock pulse period and where the range gate interval is 2T; FIG. 4C showing such relationship where δ=(½)T; and, FIG. 4D showing such relationship where δ=(¼)T; FIGS. 5A–5H are timing diagrams useful in understanding the operation of the radar system of FIG. 1, such timing diagrams showing the operation of one of the range gates used in the radar system of FIG. 1 during one of a series of dwells under a condition where the predetermined initial offset range position, δ is (¼)T as shown in FIG. 4D; FIG. 5A showing a series of transmitted pulses during the dwell; FIG. 5B showing system clock pulses during the dwell; FIG. 5C showing a radar return produced by the object illuminated by the transmitted radar pulses of FIG. 5A; FIG. 5D showing the time relationship between the radar return of FIG. 5C and the initiation of the range gate by one of the system clock pulses after each one of the transmitted radar pulses; FIG. 5E is an enlarged drawing showing the timing relationship between the system clock, range gate and a radar return produced by a first sequence of the transmitted pulses; FIG. 5F is an enlarged drawing showing the timing relationship between the system clock, range gate and a radar return produced by the second sequence of the transmitted pulses; FIG. 5G is an enlarged drawing showing the timing relationship between the system clock, range gate and a radar return produced by a third sequence of the transmitted pulses; FIG. 5H is an enlarged drawing showing the timing relationship between the system clock, range gate and a radar return produced by a fourth, and final sequence of the transmitted pulses.

DESCRIPTION OF THE PREFERRED EMBODIMENTS

Figure 1:
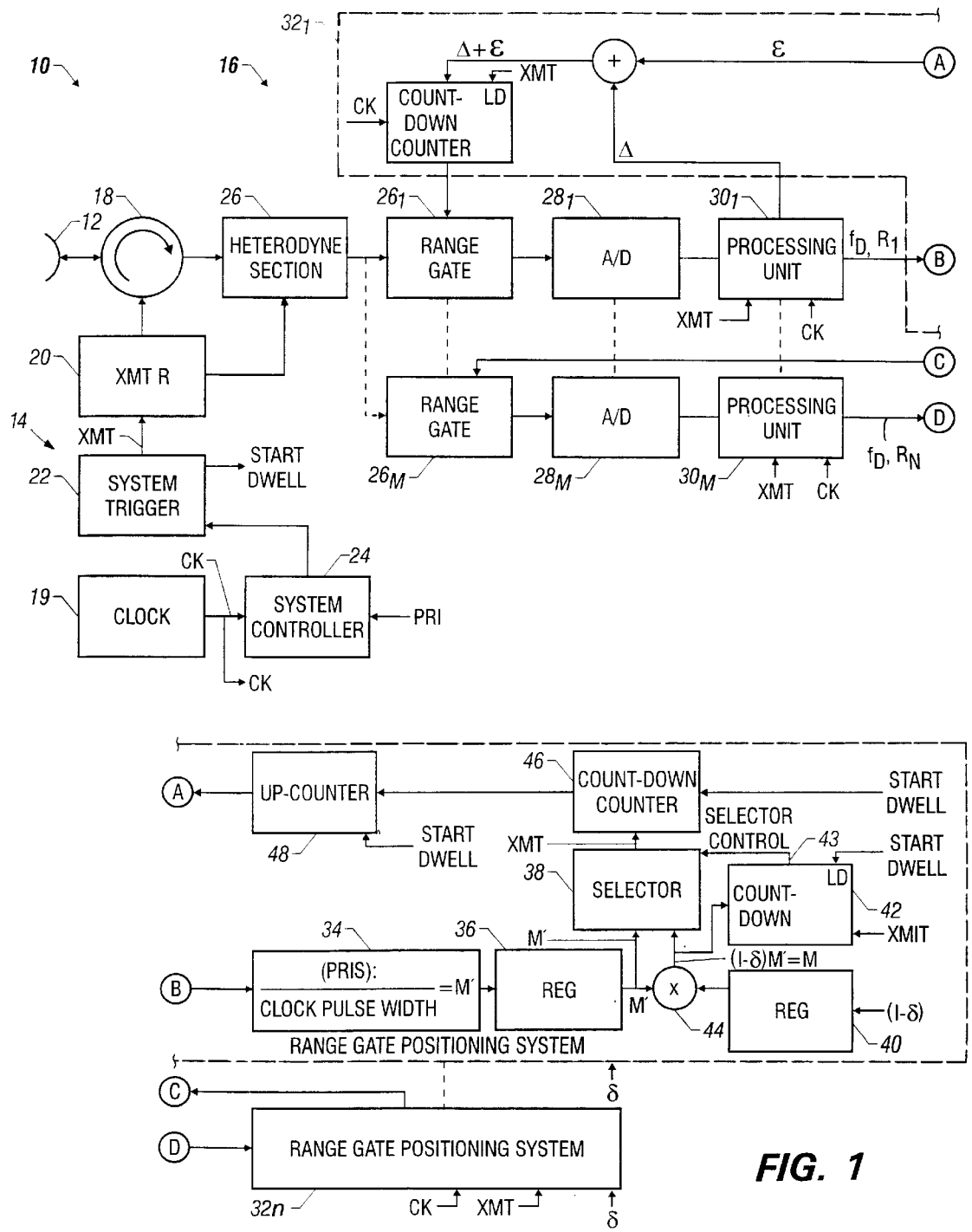
FIG. 1 is a block diagram of a radar system according to the invention, such radar system having a range gate positioning system to compensate for illuminated object Doppler velocity and a predetermined fractional offset, δ, of a clock pulse period, T, of the position of an object within the clock pulse period, T, from a predetermined desired position within the clock pulse period, T.

Referring now to FIG. 1, a pulse Doppler radar system 10 is shown adapted to determine the range and/or relative velocity of an object. The radar system 10 includes an antenna 12 coupled to a transmitter section 14 and to a receiver section 16 through a circulator, or T/R switch, 18. A system clock 19 is fed to both the transmit section 14 and the receiver section 16. The system clock 19 produces a series of clock pulses, each one thereof having a clock pulse period, T, as shown in FIG. 2A.

The transmitter section 14 includes a transmitter 20, system trigger 22 and system controller 24 arranged in a conventional manner as shown. Thus, radar pulses are transmitted at a rate referred to as the pulse repetition frequency (PRF). The time interval between successive transmitted radar pulses is referred to as the pulse repetition interval (PRI), as shown in FIG. 2B. Each radar return is received by antenna 12 and fed by circulator 18 to the receiver section 16. The received radar returns are heterodyned, in a conventional manner, to baseband by a heterodyning section 26. The baseband signal is fed to a plurality of range gates, $26_1$–$26_n$, as shown. The outputs of range gates $26_1$–$26_n$ are fed to analog to digital converters (A/Ds) $28_1$–$28_n$, respectively, as shown. The outputs of the A/Ds are fed to processors $30_1$–$30_n$, respectively, as shown. The processors $30_1$–$30_n$ determine the Doppler velocity of an object return, R, in the gate $26_1$–$26_n$, respectively.

Thus, during a predetermined time after each transmitted pulse, radar return signals are reflected by an object, not shown. If it is assumed for purposes of understanding that there is only a single point object which reflects the transmitted radar pulse, the radar return will be a pulse, R, which is received at a delay Δ or time $t_R$, (FIG. 2C) after the radar pulses is transmitted. The range gates $26_1$–$26_n$ are initiated (i.e., opened) at a different time, i.e., times $t_1$–$t_n$, respectively, as shown in FIG. 2D and once initiated each one of the range gates $26_1$–$26_n$ is open for the same predetermined time duration (i.e., range gate width or time duration), here two clock pulse periods (i.e., each range gate has a window of 2T). The initiating of the range gates $26_1$–$26_n$ is staggered by a range gate width (i.e., time duration). Thus, the times $t_1$–$t_n$ have a time duration of here, 2T therebetween, as shown in FIG. 2D. It follows then that the range to the object may be determined by detecting the presence or absence of object reflected energy, R, in each of range gates $26_1$–$26_n$. Referring to example shown in FIGS. 2B–2D, the object produces a radar return, R, which is received at a time $t_R$, where $t_R$ is between times $t_1$ and $t_2$. Thus, the object return, R, is detected at the output of range gate $26_1$. Because the radar system 10 knows the time that range gate $26_1$ was initiated relative to the time the radar pulse (XMT$_1$) was transmitted, the radar system 10 is able to determine the range from the radar system 10 to the object.

In order to accurately determine the Doppler velocity of the object, the range gated signals received from a plurality of transmitted radar pulses, i.e., over a radar dwell, are processed. For example, referring to FIGS. 3A–3D, each dwell is shown to include the returns from twelve transmitted radar pulses $XMT_1$–$XMT_{12}$, as indicated. (It should be understood that the use of twelve pulses is for purposes of illustration and that the number of pulses per dwell may be more typically in the order of 1000.) It is next noted that in this example, that the radar return $R_1$ (FIG. 3C) from the object occurs at a time 0.3125*2T from clock pulse #1 (FIG. 3B) after the transmission of the first transmitted pulse, $XMT_1$, (FIG. 3A) in the dwell (i.e., the return from the object will, in this example, occur during the first 31.25% of the duration of the range gate $26_1$ (FIGS. 3D and 3E)). It is next noted that here, in this example, the object has a Doppler velocity such that the object's radar return changes in range from the radar system at a rate of ¼th clock pulse period per transmitted radar pulse. Thus, the radar return, $R_2$ (FIG. 3C), from the object in response to the second transmitted radar pulse, $XMT_2$, will, in this example, will occur at a time [0.3125+0.125]*2T from clock pulse #1 (FIG. 3B) after the transmission of the second transmitted pulse, $XMT_2$, in the dwell (i.e., the return, $R_2$, from the object will, in this example, occur during the first 43.75% of the duration of the range gate $26_1$ (FIGS. 3D and 3E)). It follows that, in this example, that the radar return from the object in response to the third transmitted radar pulse, $XMT_3$, will, in this example, will occur at a time [0.3125+0.250]*2T from clock pulse #1 after the transmission of the third transmitted pulse, $XMT_3$, in the dwell (i.e., the return from the object will, in this example, occur during the first 56.25% of the duration of the range gate $26_1$) and that the radar return from the object in response to the fourth transmitted radar pulse, $XMT_4$, will, in this example, will occur at a time [0.3125+0.375]*2T from clock pulse #1 after the transmission of the fourth transmitted pulse, $XMT_4$, in the dwell (i.e., the return from the object will, in this example, occur during the first 68.75% of the duration of the range gate $26_1$), as shown in FIGS. 3D and 3E.

Thus, it is noted from FIG. 3E that the average position of the return from the object for the first four transmitted radar pulses $XMT_1$–$XMT_4$ is in the middle of the range gate $26_1$. With such condition, processor $30_1$ is able to determine the Doppler velocity of the object with maximum signal to noise ratio. In order to maintain the average position of the returns $R_5$–$R_8$ (FIG. 3F) from the object for the next four transmitted radar pulses $XMT_5$–$XMT_8$ with the same 2T range gate width, range gate $26_1$ is, in this example, initiated by the next clock pulse after clock pulse #1 (i.e., range gate $26_1$ is initiated by clock pulse #2. FIGS. 3B, 3C and 3D), for the next four transmitted radar pulses $XMT_5$–$XMT_8$, as shown in FIGS. 3A–3D and 3F). The process of incrementing the clock pulse which initiates the range gate $26_1$ repeats as indicated in FIGS. 3A–3F and FIG. 4A.

Because, in any practical radar system there may be an initial offset range position, δ, with the clock pulse period, T, (FIGS. 4B–4D) for δs of (¾)T, (½)T and (¼)T, respectively, of the object within the range gates $26_1$–$26_n$ from a predetermined desired range position within the range gates $26_1$–$26_n$, range gate positioning systems $32_1$–$32_n$ (FIG. 1), respectively, are provided to maintain the average position of the return from the object for, in this example, each set of twelve transmitted radar pulses $XMT_5$–$XMT_8$ in a dwell, at the center of the range gates $26_1$–$26_n$.

Thus, consider that there is an initial offset, δ. This initial offset, δ, is typically determined during a calibration phase at the factory or test facility. That is instead of the range gate $26_1$ being initiated by clock pulse #1, for example, it is initiated a time delay δT after clock pulse #1. Once the offset, δ, is determined, the clock pulse used to initiate the range gate $26_1$ is adjusted in a manner to be described.

Referring to FIGS. 4D and 5A–5H, it is noted that in order for the average position of the return from the object for the entire dwell, here for the twelve transmitted radar pulses $XMT_1$–$XMT_{12}$ in the middle of the range gate $26_1$, the range gate $26_1$ must be imitated by clock pulses #1 for the first two transmitted pulses $XMT_1$ and $XMT_2$ (FIG. 5E), then the range gate $26_1$ must be initiated by clock pulse #2 for the next four transmitted pulses $XMT_4$–$XMT_7$ (FIG. 5F), then the range gate $26_1$ must be imitated by clock pulses #3 for the next four transmitted pulses $XMT_8$ and $XMT_{11}$ (FIG. 5G), and then the range gate $26_1$ must be initiated by clock pulse #4 for the last transmitted pulses $XMT_{12}$ (FIG. 5H) in the dwell. The process described above in connection is performed by the range gate positioning system $32_1$ (FIG. 1).

In operation, and considering an example where δ=(¼)T and M'=4, the multiplier 44 determines M=3 which becomes stored at the beginning of each dwell as the initial count in count-down counter 42. When the count, here M=3, in the count-down counter 42 is greater than zero, a logic 1 is produced in the selector control line 43 fed to the selector 38 thereby selecting M as the output of the selector 38. Thus, in response to the trigger pulse XMT produced by the system trigger 22, M=3 becomes loaded as the initial count of count-down counter 46. The contents of counter 46 decrement by one in response to each transmitted pulse system clock pulse after a delay 47 which corresponds to an estimate of the range to the object determined during the initial object acquisition phase. It is noted that here in this example, after the first 3 transmitted radar pulses, $XMT_1$, $XMT_2$, $XMT_3$, the count in count-down counter 42 becomes zero until the next dwell (i.e., after each set of here twelve radar pulses have been transmitted). When the count in counter 43 becomes zero (i.e., after each of the first three transmitted radar pulses in each dwell) the control signal on line 43 changes from a logic 1 to a logic zero thereby coupling the contents of register 36 (i.e., M') to count-down counter 38. In response to the next transmitted pulse $XMT_4$ in the dwell, the count-down counter 46 has stored as the initial count thereof M', here 4. Range gate $26_1$ is initiated by clock pulse #1, as shown in FIGS. 5B and 5D. Thus, the object return R'$_1$ here occurs at a time [0.3125*2T]+δT from clock pulse #1 (FIG. 3B) after the transmission of the first transmitted pulse, $XMT_1$, (FIG. 5A) in the dwell (i.e., the return from the object will, in this example, occur during the first 43.755% of the duration of the range gate $26_1$ (FIGS. 5D and 5E)).

The initiation of range gates $26_1$–$26_n$ is performed by range gate positioning systems $32_1$–$32_n$, respectively. Each one of the range gate positioning systems $32_1$–$32_n$ operates in the same manner, an exemplary one thereof, here range gate positioning system $32_1$, being shown in more detail in FIG. 1 to include a unit 34 for determining from the Doppler velocity initially estimated by the processing unit $30_1$ during a prior object acquisition phase, and the a priori known clock pulse period, T, and radar system 10 PRI, the number of PRIs per clock pulse period that the object moves in range relative to the radar system 10 (i.e., M'=PRIs/T). Considering the example described above in connection with FIGS. 3A–3E and 4A where δ=0, the object moves at a Doppler velocity corresponding to 4PRIs/T; i.e., thus, unit 34 computes M'=4. The computed M' is stored in a register 36. The output of register 36 provides one input to a selector 38 and to one input to a multiplier 44. A register 40 stores a value $(1-(\delta/T))$ and such value is used as a second input to the multiplier 44. The input $(1-(\delta/T))$ stored in register 40 is loaded as an initial count in count-down counter 42 at the start of each dwell. The count-down counter 42 decrements by one in response to each transmitted radar pulse trigger, XMT, produced by system trigger 22. The output of the multiplier 44 i.e., $(1-(\delta/T))M'=M$ is also fed as a second input to the selector 38. The output of the count-down multiplier 42 provides a control signal on line 43 for the selector 38. The control signal on line 43 is a binary signal and couples one of the two inputs to the selector selectively to the output of the selector 43. The output of the selector 38 provides an initial count for count-down counter 46. The initial count is loaded into the count-down counter 46 in response to each system 22 trigger pulse, XMT. The count-down counter 46 is loaded with the count produced at the output of the selector 38 at the start of each dwell. The count in the count down-counter 46 is decremented by one in response to each transmitted radar pulse clock (i.e., in response to each trigger pulse XMT produced by system trigger 22). The count in the count-down counter 46 is, in this example, M=3, for the first three transmitted pulses, after which the count changes to M'=4 for the last nine transmit pulses in the dwell. Thus, in response to the first transmitted pulse $XMT_1$, the contents of count down-counter 46 decrements from 3 to 2. In response to the second transmitted pulse $XMT_2$, the contents of count down-counter 46 decrements from 2 to 1. In response to the third transmitted pulse $XMT_3$, the contents of count down-counter 46 decrements from 1 to 0 and produces a pulse which is fed to an up-counter 48.

The contents of the up-counter 48 is reset to zero at the start of each dwell and increments by one in response to each pulse produced by count-down counter 46 counting down to zero. Thus, it follows that the count of up-counter 48 is initially zero, then increments to one after the first three transmitted radar pulses ($XMT_1$–$XMT_3$), then increments to two after the next four transmitted radar pulses ($XMT_4$–$XMT_7$), and then increments to three after the next four transmitted radar pulses ($XMT_8$–$XMT_{11}$) and then increments to four after the twelfth transmitted radar pulse $XMT_{12}$.

The count of counter 48 is added to the delay $\Delta$ estimated as the object range during the object acquisition phase.

Figures 4A, 4B, 4C, 4D, 4E:
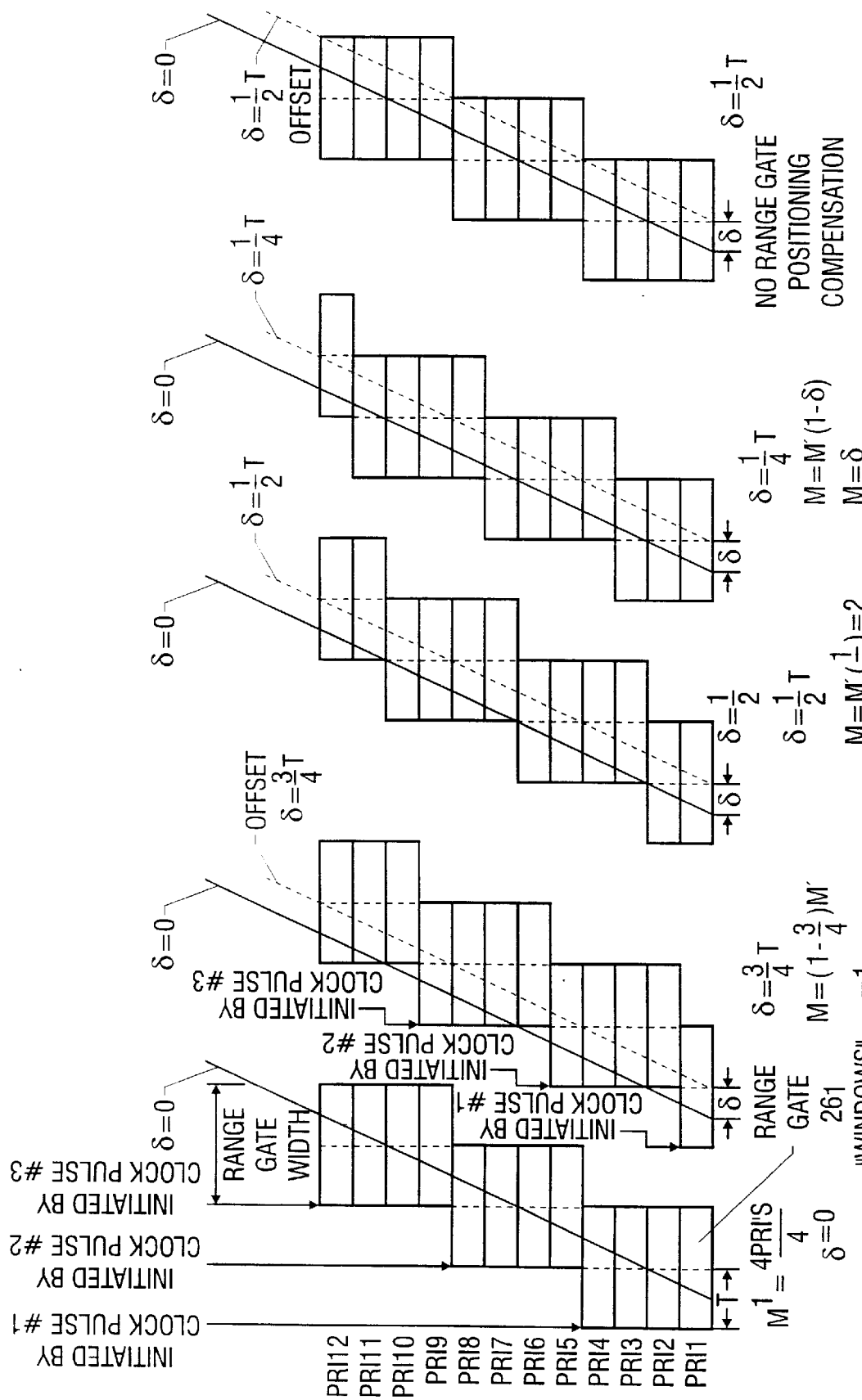
FIGS. 4A–4D are diagrams showing the relationship between the position of the object described in connection with FIGS. 3A–3F and the position of the radar return from the object in a range gate during each of a series of pulse repetition intervals (PRIs) following a corresponding one of the series of transmitted pulses shown in FIG. 3A.
FIG. 4E showing the relationship where δ=(½)T and where the radar system of FIG. 1 does not include a range gate positioning system to compensate for the Doppler velocity of the object.

The effect of not compensated for the initiation of the range gate window where the initial offset $\delta=0$ is shown in FIG. 4E. It is noted that without range gate positioning the radar return from the object will not average in the center of the range gate.

Other embodiments are within the spirit and scope of the appended claims.

What is claimed is:

1. A radar system, comprising:
    a system clock for producing a series of clock pulses;
    a range gate for sampling each one of a series of radar returns produced in response to a each one of a series of transmitted radar pulse, the range gate having a time duration equal to an integer number of, N, clock pulse periods;
    a range gate positioning system, such range gate positioning system initiating the range gate a selected time, $\Delta$, after each one of the transmitted pulses, such selected time, $\Delta$, being an integer number of, M, clock pulse periods for a predetermined number of transmitted pulses and then subsequently changing to a different integer number, M'.

2. A radar system for processing a series of radar returns to determine Doppler velocity of an object, each one of the radar returns being produced in response the object reflecting each one of a series of transmitted radar pulses, the series of radar returns being processed in a sequence of successive dwells, each one of the dwells having a predetermined number of radar returns, such radar system comprising:
    a system clock for producing a series of clock pulses;
    a range gate for sampling each one of a series of radar returns produced in response to a each one of a series of transmitted radar pulse, the range gate having a time duration equal to an integer number of, N, clock pulse periods;
    a range gate positioning system, such range gate positioning system initiating the range gate a selected time, $\Delta$, after each one of the transmitted pulses, such selected time, $\Delta$, being an integer number of, M, clock pulse periods for a predetermined number of transmitted pulses and then subsequently changing to a different integer number, M'; and
    wherein the range gate positioning system determines the integer number, M, in accordance with a predetermined fractional offset, $\delta$, of a clock pulse period, T, of the position of an object within the clock pulse period, T, from a predetermined desired position within the clock pulse period, T, and the integer M' being determined in accordance with the Doppler velocity of the object; and
    a processor for determining from each one of the dwells, the Doppler velocity of the object.

3. The radar system recited in claim 2 wherein the range gate positioning system determines M' is accordance with $M'=Tc/2V_D(PRI)$, where T is the clock pulse period, c is the speed of light, $V_D$ is the Doppler velocity of the object and PRI is the time duration between successively transmitted radar pulses and determines M in accordance with $M=[1-(\delta/T)]M'$.

4. A radar system for processing a series of radar returns to determine Doppler velocity of an object, each one of the radar returns being produced in response the object reflecting each one of a series of transmitted radar pulses, the series of radar returns being processed in a sequence of successive dwells, each one of the dwells having a predetermined number of radar returns, such radar system comprising:
    a system clock for producing a series of clock pulses;
    a range gate for sampling each one of the radar returns in the series thereof, the range gate having a time duration equal to an integer number of clock pulse periods;
    a range gate positioning system including a counter for counting the transmitted radar pulses in the dwell, such range gate positioning system initiated the range gate a selected time, $\Delta$, after each one of the transmitted pulses, such selected time, $\Delta$, being an integer number of, M, clock pulse periods for a predetermined number of transmitted pulses and then subsequently changing to a different integer number, M'; and
    a processor for determining from each one of the dwells, the Doppler velocity of the object.

5. A radar system for processing a series of radar returns to determine Doppler velocity of an object, each one of the radar returns being produced in response the object reflecting each one of a series of transmitted radar pulses, the series of radar returns being processed in a sequence of successive dwells, each one of the dwells having a predetermined number of radar returns, the range to the object at being at a predetermined initial offset range position within the range gate from a predetermined desired range position within the range gate, such radar system comprising:

a system clock for producing a series of clock pulses;

a range gate for sampling each one of the radar returns in the series thereof, the range gate having a time duration equal to an integer number of clock pulse periods;

a range gate positioning system including a counter for counting the transmitted radar pulses in the dwell, such range gate positioning system initiated the range gate a selected time, $\Delta$, after each one of the transmitted pulses and establishing the selected time, $\Delta$, the selected time, $\Delta$, being an integer number of, M, clock pulse periods for a predetermined number of transmitted pulses and then subsequently changing to a different integer number, M', and, wherein the range gate positioning system determines the integer number, M, in accordance with a predetermined fractional offset, $\delta$, of a clock pulse period, T, of the position of an object within the clock pulse period, T, from a predetermined desired position within the clock pulse period, T, and the integer M' being determined in accordance with the Doppler velocity of the object; and a processor for determining from each one of the dwells, the Doppler velocity of the object.

6. The radar system recited in claim 5 wherein the range gate positioning system determines M is accordance with $M'=Tc/2V_D(PRI)$, where T is the clock pulse period, c is the speed of light, $V_D$ is the Doppler velocity of the object and PRI is the time duration between successively transmitted radar pulses and determines M in accordance with $M=[1-(\delta/T)]/M'$.

7. A radar system for processing a series of radar returns to determine range and Doppler velocity of an object, each one of the radar returns being produced in response the object reflecting each one of a series of transmitted radar pulses, the series of radar returns being processed as a sequence of dwells, such system, comprising:

a system clock for producing a series of clock pulses;

a plurality of range gates, each one thereof sampling each one of the radar returns in the series thereof in response to the clock pulses, each one of the range gates having a time duration equal to an integer number of clock pulse periods, each one of the range gates being initiated a different predetermined time after a corresponding one of the transmitted pulses;

a range gate positioning system for maintaining the range to the object at a predetermined position within each dwell, such range gate positioning system determining the number of radar returns in a first one of the dwells and the number of radar returns in each of the succeeding dwells; and a processor for determining from each one of the dwells, the Doppler velocity of the object in such dwell.

* * * * *